United States Patent [19]
Asayama

[11] Patent Number: 5,381,173
[45] Date of Patent: Jan. 10, 1995

[54] INTER-CAR DISTANCE DETECTING DEVICE FOR TRACKING A CAR RUNNING AHEAD

[75] Inventor: Yoshiaki Asayama, Hyogo, Japan

[73] Assignee: Mitsubishi Denki Kabushiki Kaisha, Tokyo, Japan

[21] Appl. No.: 934,215

[22] Filed: Aug. 25, 1992

[30] Foreign Application Priority Data

Aug. 28, 1991 [JP] Japan ................... 3-217028

[51] Int. Cl.$^6$ ............................................. H04N 7/18
[52] U.S. Cl. ...................... 348/170; 348/148; 348/169
[58] Field of Search ............... 358/103, 105, 107, 125, 358/126; H04N 7/18; 348/139, 148, 169, 170

[56] References Cited

U.S. PATENT DOCUMENTS

| | | | |
|---|---|---|---|
| 4,749,848 | 6/1988 | Sorimachi | 250/201 |
| 4,926,346 | 5/1990 | Yokoyama | 364/518 |
| 5,023,712 | 6/1991 | Kajiwara | 358/105 |
| 5,139,327 | 8/1992 | Tanaka | 358/126 |
| 5,168,355 | 12/1992 | Asayama | 358/103 |
| 5,177,462 | 1/1993 | Kajiwara | 358/125 |
| 5,187,537 | 2/1993 | Asayama | 358/105 |
| 5,214,408 | 5/1993 | Asayama | 358/125 |
| 5,223,907 | 6/1993 | Asayama | 358/126 |
| 5,237,406 | 8/1993 | Karasudani et al. | 358/126 |

FOREIGN PATENT DOCUMENTS

| | | |
|---|---|---|
| 60-33352 | 8/1985 | Japan . |
| 63-38085 | 7/1988 | Japan . |
| 63-46363 | 9/1988 | Japan . |
| 3195916 | 8/1991 | Japan . |
| 3197805 | 8/1991 | Japan . |

*Primary Examiner*—Tommy P. Chin
*Assistant Examiner*—Richard Lee
*Attorney, Agent, or Firm*—Sughrue, Mion, Zinn, Macpeak & Seas

[57] ABSTRACT

An inter-car distance detecting device for tracking a car running ahead, and automatically setting a tracking window in a display screen. The inter-car distance detecting device has a pair of image sensors which pick up the image of a car running ahead. A window setting section sets a plurality of windows, so that the distances from objects contained in those windows are detected and a position of the car running ahead is detected by comparing the distances corresponding to the windows between containing the car running ahead and un-containing. Thereby, a position and a size of a tracking window is set in the display screen at the position of the car running ahead thus detected.

6 Claims, 4 Drawing Sheets

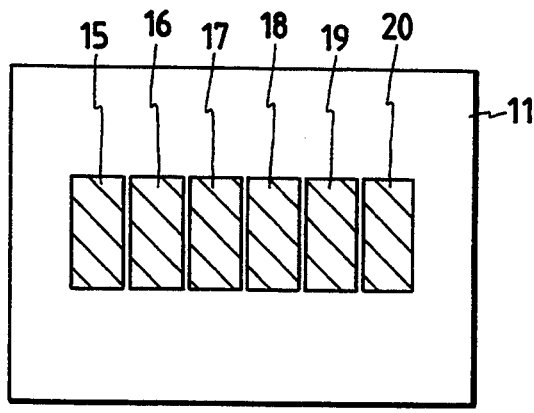
FIG. 2
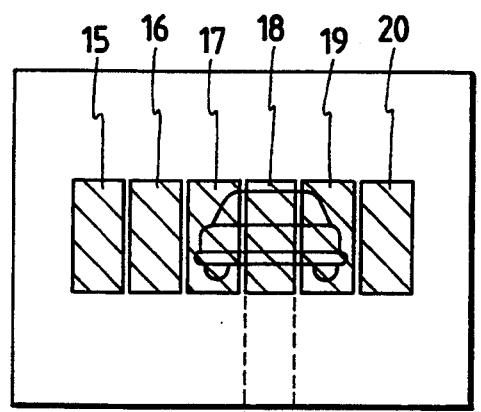
FIG. 4
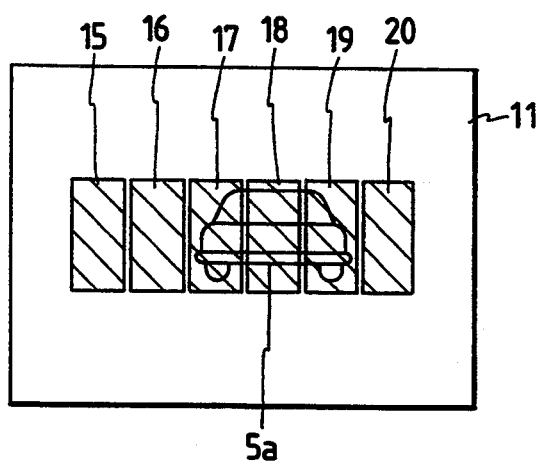
FIG. 3
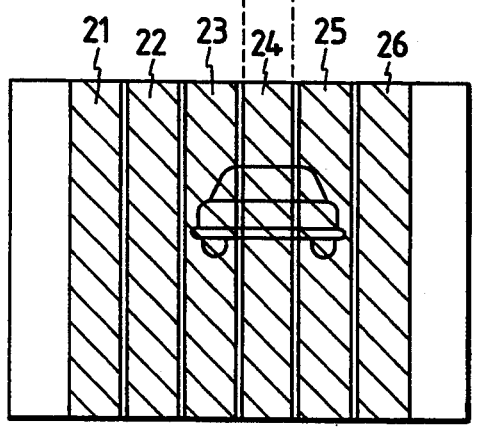

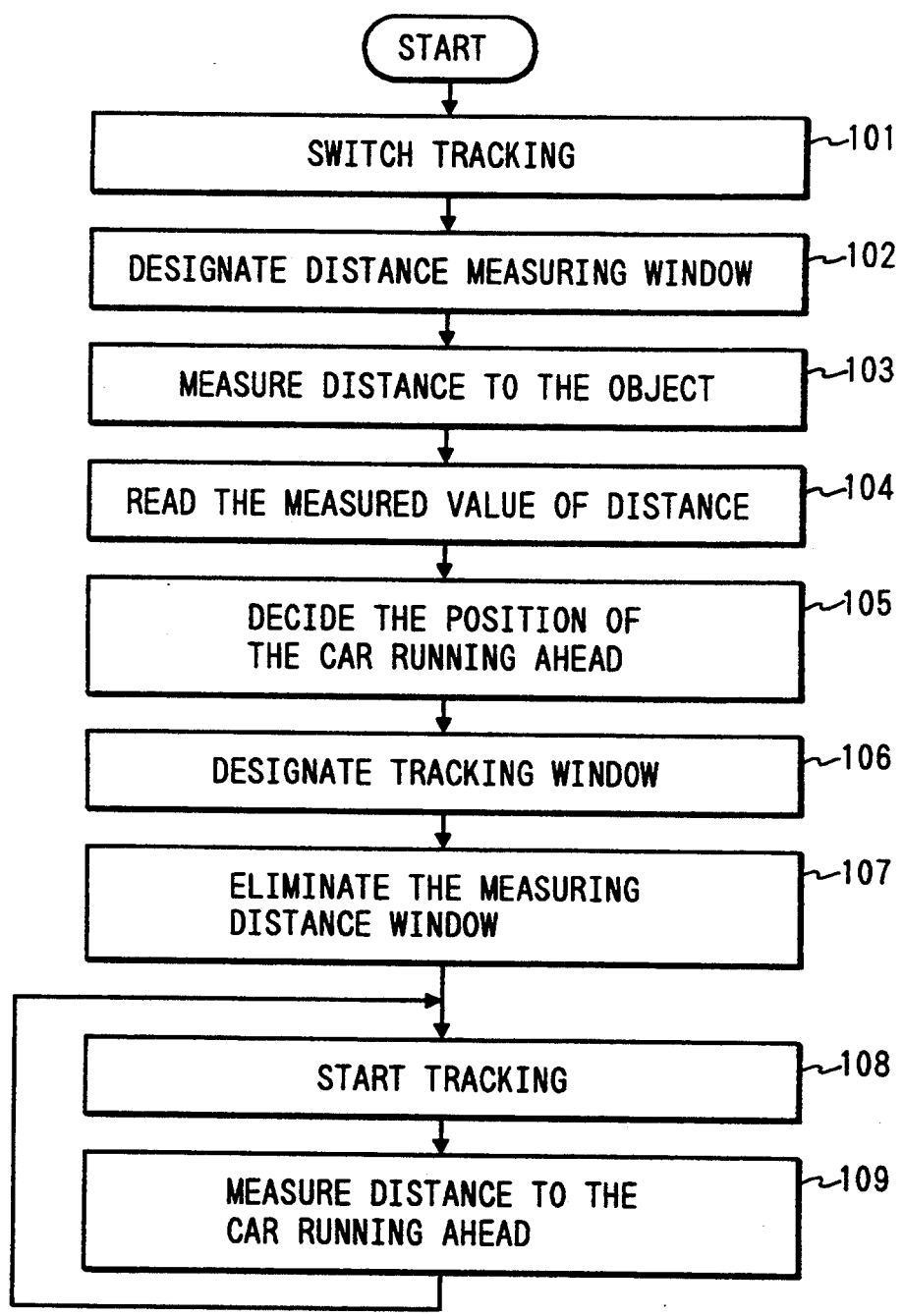

INTER-CAR DISTANCE DETECTING DEVICE FOR TRACKING A CAR RUNNING AHEAD

DETAILED DESCRIPTION OF THE INVENTION

This invention relates to a distance detecting device in optical having an image sensor, and more particularly to a device which continuously measures a distance between a first car and another car ahead of the first car (hereinafter referred to as "an inter-car distance detecting device", when applicable) for tracking the car running ahead.

Distance detecting devices in optical have been disclosed, for instance, by Japanese Patent Publication No's Sho. 63-38085 and 63-46363. Each of those conventional distance detecting devices, as shown in FIG. 8, comprises: a pair of right and left optical systems made up of lenses 1 and 2 which are spaced apart from each other as much as a base length L; image sensors 3 and 4 outputting image signals which are disposed at a position to be determined by focal distance f of the lenses 1 and 2, respectively; and a signal processing unit 30 for processing the images signals output by the image sensors 3 and 4.

The conventional distance detecting device operates as follows: The signal processing device 30 superposes the output image signals of the right and left image sensors 4 and 3 every shifting them, and detects the amount of shift l when the two image signals are most closely aligned, so that the distance R from the object 31 under measurement is obtained, according to the principle of trigonometrical measurement, from the following equation:

$$R = f \times L / l$$

On the other hand, for instance Japanese Patent Publication No. Sho. 60-33352 discloses a method of tracking the image of a car running ahead which is detected by an image sensor or the like. In the method, the operator sets a tracking gate (or window), which surrounds an object to be tracked, in the display screen while watching it so that the image of the object is tracked on the display screen.

The conventional distance detecting device thus organized suffers from the following difficulties: For simplification in description, hereinafter a car on which the device is installed will be referred to as "a first car", and another car running ahead of the car (the first car) as "a second car", when applicable. If another car is running on the right or left side of the second car (hereinafter referred to as "a third car", when applicable), the operator cannot detect which of the cars is under measurement.

Furthermore, in order to track the image of the second car, the operator has to watch the display while driving so as to set the tracking window. While the operator is setting the window in this way, his attention to the outside is liable to be distracted, which may result in the occurrence of a traffic accident.

SUMMARY OF THE INVENTION

Accordingly, an object of this invention is to eliminate the above-described problems accompanying a conventional inter-car distance measuring method. More specifically, an object of the invention is to provide an inter-car distance detecting device for tracking a car running ahead, in which; if a car is selected as a target, the distance to it can be continuously measured as long as the target is in the field of sight; even in the case where there are a plurality of cars running ahead, it can be detected which of the cars is under distance measurement; and the tracking window for the car can be automatically set.

The foregoing object of the invention has been achieved by the provision of an inter-car distance detecting device for tracking a car running ahead which, according to the invention, comprises: a pair of image sensors, e.g. upper and lower; display means having a display screen for displaying one of a pair of images picked up by the image sensors; window setting means for setting a plurality of windows; distance detecting means for detecting distance of each windows; window selecting means for selecting the windows which cover the image of a car under measurement; tracking window setting means for setting a tracking window referring to the positions of the windows thus selected; and tracking distance detecting means for detecting a distance from the car with the aid of the tracking window.

With the inter-car distance detecting device for tracking a car running ahead according to the invention, a plurality of windows are set in the image of a car running ahead which may be located e.g. in a display screen, and with the images in those windows as reference images, the upper and lower images picked up by the pair of image sensors are subjected to comparison, and the amount of shift between the two images is electrically detected, whereby distances from objects covered by the windows are obtained according to the principle of trigonometric measurement.

In the case where, of those distances thus obtained, the same distance which is less variable and relatively short are measured with a plurality of windows, it is determined that the image of the car running ahead is covered by those windows, and a tracking window for tracking the image of the car is set with reference to the positions of the windows.

Under this condition, the distance from the car running ahead is continuously measured.

BRIEF DESCRIPTION OF THE DRAWINGS

FIG. 2 is an explanatory diagram showing a plurality of windows set in the display screen of a display section in the above embodiment.

FIG. 3 is an explanatory diagram showing the image of a car running ahead which comes in the display screen.

FIG. 4 is an explanatory diagram showing image regions which are compared with reference images in the windows.

FIG. 7 is a flow chart for describing the operation of the inter-car distance detecting device according to the invention.

DETAIL DESCRIPTION OF THE PREFERRED EMBODIMENT

One preferred embodiment of this invention will be described with reference to the accompanying drawings.

Figure 1:
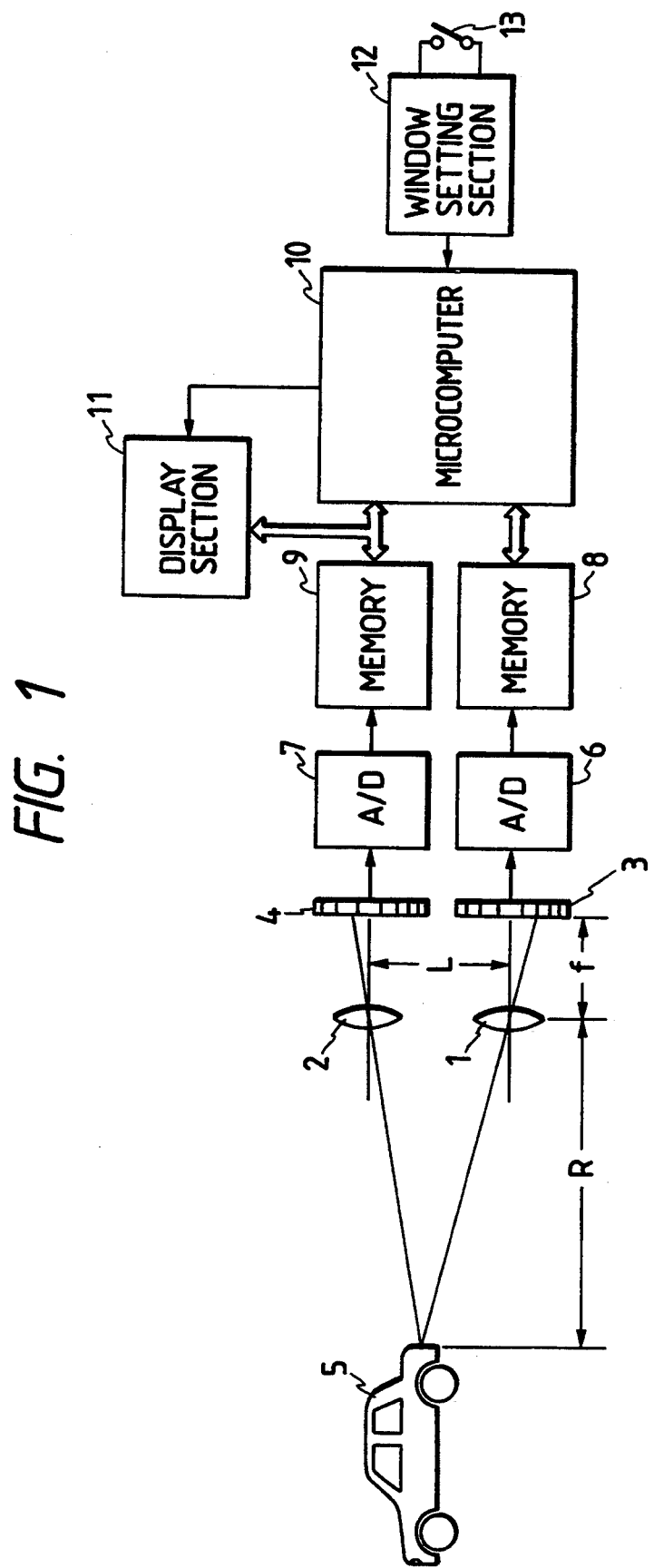
FIG. 1 is a block diagram showing one embodiment of an inter-car distance detecting device for tracking a car running ahead of this invention.

FIG. 1 shows the arrangement of an inter-car distance detecting device for tracking a car running ahead, which constitutes the embodiment of the invention, and is installed on a car (hereinafter referred to as "a first car", when applicable). In FIG. 1, lenses 1 and 2 form upper and lower optical systems for forming the images of a car running ahead of the first car, respectively (hereinafter referred to as "a second car", when applicable). Two-dimensional image sensors 3 and 4 are provided for the lenses 1 and 2, respectively. The second car 5 runs ahead of the first car on which the device is installed. Analog-to-digital converters 6 and 7 convert signals from the sensors 3 and 4, respectively. Memories 8 and 9 store respective signals from the converters 6 and 7. A microcomputer 10 is provided (the function of which is described later). A display section 11 which displays the image picked up by the upper image sensor 4 is controlled by the microcomputer 10.

Further in FIG. 1, a window setting section 12 sets a plurality of windows 15, 16, 17, 18, 19 and 20 which are used to specify the image of an object on the display screen the distance from which is to be measured. Those windows 15 through 20 are arranged in places on the display screen of the display section 11 as shown in FIG. 2. Further in FIG. 1, an image tracking instruction switch 13 is operated by the operator so as to instruct an image tracking.

It is assumed that, as shown in FIG. 3, the image 5a of the second car 5 appears in the image of a landscape ahead of the first car which is picked up by the upper image sensor 4 and displayed on the display screen. Hereupon the image 5a of the second car 5 is detected with the distance measuring windows 15 through 20 which are set where the image of a road spreading ahead of the first car is formed.

From the memory 9, the microcomputer 10 reads a picture element signal in the window 18 which substantially contains with the second car's image 5a in the embodiment of FIG. 3, and employs it as a reference image signal for intercar distance calculation. Thereafter, the microcomputer 10 selects one of regions separating the image in the memory 8 along shift direction corresponding to the window 18, in which the image signal of the lower image sensor 3 is stored in the memory 8. Moreover, the microcomputer 10, while shifting the image signal of the memory 8 one picture element by one picture element with respect to the above-described reference image signal, calculates the sum of the absolute values of the differences between the signals of upper and lower picture elements.

Namely, the microcomputer determines the position of the image which aligns more preferably with the image in the window 18, while shifting it one picture element by one picture element. In this operation, the region concerning the calculation is the region 24 of the image in the memory 8 with respect to the reference image signal in the window 18, as shown in FIG. 4, in which a position of the region 24 corresponds in position of the window 18.

If it is assumed that, during the comparison between upper and lower picture elements, the amount of shift of the picture element when the sum of the absolute values of the differences between the signals thereof becomes minimum, is represented by n picture elements; then the distance R from the second car running ahead can be calculated from the following equation:

$$R = f \times L / n \times P$$

where P is the pitch of the picture elements; L is the base length of the optical systems; and f is the focal distance of the lenses 1 and 2.

Similarly, with the windows 17 and 19 containing the second car's image 5a, the inter-car distance R is measured. With respect to the windows 15, 16 and 20 containing images of a background other than the second car 5, the distances from the parts of the background which are contained by the windows are measured, respectively. As is apparent from the above description, the images of objects contained by the distance measuring windows 15 through 20 set in the display screen of the display section 11 are subjected to comparison, respectively, so that the distances from the respective objects are measured with each of windows 15 through 20.

The distance values thus measured with the distance measuring windows 15 through 20 are applied to the microcomputer 10, where they are subjected to comparison, so as to select the windows which are adjacent to one another and contain the image having the distance of which is same and shortest. That is, the windows 17, 18 and 19 are selected which indicate the distance shorter than those from the background. Hence, it appears that the distances measured with the windows 15, 16 and 20 may containing the image of the background are larger than the distance measured with the windows 17, 18 and 19 may containing the second car's image 5, and are not equal to one another. Therefore, it can be determined that the windows 17, 18 and 19 indicating one and the same distance which has a short distance value contains the second car's image 5a.

Figure 5:
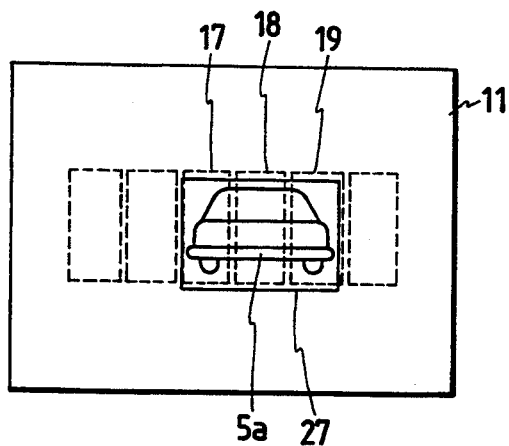
FIG. 5 is an explanatory diagram showing one tracking window set for the image of the car running ahead.
Figure 6:
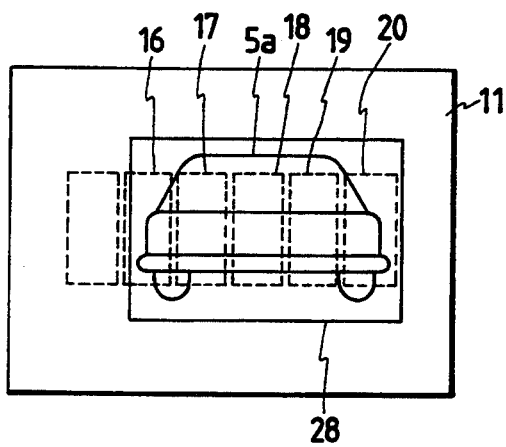
FIG. 6 is an explanatory diagram tracking window set for the image of the car running ahead.
Figure 8:
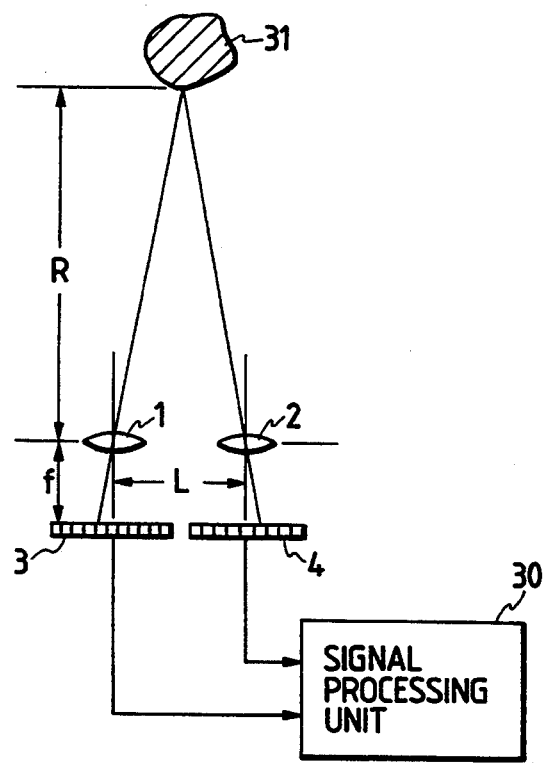
FIG. 8 is an explanatory diagram showing the arrangement of a conventional distance detecting device.

On the basis of the positions of the windows 17, 18 and 19 in the display screen of the display section, the window setting section 12 sets a tracking window 27 as shown in FIG. 5. More specifically, the tracking window 27 is set around the window 18 as a center; this is because the window 18 is a middle of the distance measuring windows 17, 18 and 19. Namely, one of predetermined sizes is selected as the size of the tracking window 27 according to the distance which is measured with the window 18. In other words, the size of the second car's image 5a changes according to the distance therefrom. Therefore, when the distance is large, a tracking window 27 is set in small size. As the distance decreases, the second car's image 5a is increased in size, and therefore a tracking window 28 is set in large size as shown in FIG. 6.

When the tracking window 27 is so set as to surround the image 5a of the second car in the above-described manner, an image tracking operation of tracking the image 5a of the second car is started. This operation is the same as is disclosed by Japanese Patent Publication No. Sho. 60-33352 or Hei. 1-35305, and therefore its detailed description will not be made herein.

Next, the distance between the second car 5 which is tracked by the tracking window 27 and the first car on which the device is installed, is detected as follows: The image signal in the tracking window 27 is determined as a reference image signal for inter-car distance calculation, and then the upper and lower image signals are subjected to comparison similarly as the afore-said method of the equation R=f×L/l, so that the inter-car distance is detected according to the principle of trigonometrical measurement. Therefore, as long as the second car's image 5a moves within the display screen of the display section 11, the tracking window 27 tracks the image 5a, and the distance between the first car and the second car 5 is detected.

The above-described operations are as indicated in a flow chart of FIG. 7. When the second car 5 comes ahead of the first car, the operator operates the image tracking instruction switch 13 to apply an operating signal to the microcomputer 10 (Step 101). In response to the signal, the microcomputer 10 controls the window setting section 12, to set the distance measuring windows 15 through 20 in place in the display screen of the display section 11 (Step 102).

Under this condition, the distances from objects contained by the windows 15 through 20 are measured according to the principle of trigonometrical measurement, during the comparison between upper and lower picture elements on the basis of the image in each distance measuring window as a reference image (Step 103). Data on the distances thus measured and the positions of the windows are stored in memory (Step 104). The windows 17, 18 and 19 are selected which indicate one and the same distance which is shorter than those from the background, so that the position of the second car's image 5a is determined (Step 105).

The second car's image 5a is substantially detected on the basis of the positions of the windows 17, 18 and 19 and the distance measured with those windows or variation of the distance. Therefore, referring to the positions of the windows 17, 18 and 19 thus selected, a tracking window 27 for tracking the second car 5 is newly set the size of which corresponds to the distance measured (Step S106), while the distance measuring windows 15 through 20 are erased from the display screen of the display section 11 (Step 107). Thereafter, the operation of tracking the image of the second car 5 with the tracking window 27 is started (Step 108), and the distance R between the first car and the second car, the image of which is contained by the tracking window 27, is continuously detected according to the principle of trigonometrical measurement, during the comparison between upper and lower picture elements on the basis of the image in the tracking window as a reference image (Step 109).

As was described above, according to the invention, a plurality of windows are set in place in the display screen which is adapted to display one of the images picked up by a pair of image sensors which are positioned substantially above and below, and distances from objects of the images of which are contained by those windows are detected. The distances thus detected are utilized to pick up the image of the second car running ahead, and the tracking window surrounding the image of the second car is newly set in the display screen, to detect the distance from the second car. That is, the tracking window for tracking the image of the second car is automatically set, which contributes to safe driving.

In addition, the image of the second car under measurement is displayed on the display screen and surrounded with the tracking window. Therefore, the operator can detect which of the cars running ahead is under distance measurement or is being followed by his car.

What is claimed is:

1. An inter-car distance detecting device installed on a first car for tracking a second car running ahead of said first car, said inter-car distance detecting device comprising:
    a pair of image sensors each for picking up an image of objects including said second car and background;
    window setting means for setting a plurality of distance measuring windows in predetermined positions in the image picked up by one of said image sensors, respectively;
    distance detecting means for comparing the image contained within each of said distance measuring windows with a corresponding image picked up by the other of said image sensors, to detect distances from said first car to parts of said objects contained within each of said distance measuring windows;
    window selecting means for selecting said distance measuring windows which contain the image of said second car according to a detection value of said distance detecting means;
    tracking window setting means for automatically setting a tracking window for tracking the image of said second car with reference to said distance measuring windows selected by said window selecting means; and
    tracking distance detecting means for detecting a distance to said second car in the image contained within said tracking window,
    wherein said window selecting means compares said distances detected by said distance detecting means with each other to select said distance measuring windows which are adjacent to one another and contain the image of the second car having distances which are equal and shorter than those of nonselected distance measuring windows.

2. An inter-car distance detecting device according to claim 1, further comprising display means for displaying said image picked up by one of said sensors, distance measuring windows and tracking windows.

3. An inter-car distance detecting device according to claim 1, wherein said image sensors are positioned along a vertical direction.

4. An inter-car distance detecting device according to claim 1, wherein said tracking window setting means sets a position of said tracking window with reference to a center window of said distance measuring windows selected by said window selecting means.

5. An inter-car distance detecting device according to claim 1, wherein said tracking window setting means sets a size thereof with reference to the number of said distance measuring windows selected by said window selecting means.

6. An inter-car distance detecting device according to claim 1, further comprising an optical system including a pair of lenses corresponding to said pair of image sensors, respectively, wherein said distance detecting means superposes the image contained in one of said distance measuring windows with the image of the other sensor along the position of this window while shifting one pixel element by one pixel element, and detects the amount of shift l when the two images are most closely aligned according to the following equations:

$$R = f \times L / n \times P$$

$$R = f \times L / l$$

where R is a distance from the second car running ahead; P is the pitch of the picture elements; L is base length of said optical system; and f is focal distance of said lenses.

* * * * *